(12) United States Patent
Thibault et al.

(10) Patent No.: US 8,013,242 B1
(45) Date of Patent: Sep. 6, 2011

(54) OUTDOOR ELECTRICAL BOX

(75) Inventors: Steve Thibault, Harwinton, CT (US); Jean-Luc Godard, West Granby, CT (US); Mark Makwinski, Cromwell, CT (US); Richard P. Picard, West Hartford, CT (US)

(73) Assignee: The Wiremold Company, West Hartford, CT (US)

( * ) Notice: Subject to any disclaimer, the term of this patent is extended or adjusted under 35 U.S.C. 154(b) by 456 days.

(21) Appl. No.: 12/178,107

(22) Filed: Jul. 23, 2008

Related U.S. Application Data

(60) Provisional application No. 60/951,246, filed on Jul. 23, 2007.

(51) Int. Cl.
*H01H 9/02* (2006.01)
*H02G 3/08* (2006.01)

(52) U.S. Cl. ............ 174/53; 174/50; 174/481; 174/482; 220/3.2; 220/3.3

(58) Field of Classification Search .................. 174/480, 174/481, 50, 53, 57, 58, 482, 66, 67; 220/3.2–33.9, 220/4.02, 241, 242; 52/220.1, 220.3; 439/535, 439/536; 248/906
See application file for complete search history.

(56) References Cited

U.S. PATENT DOCUMENTS

| | | | | |
|---|---|---|---|---|
| 4,265,365 A * | 5/1981 | Boteler | ........................... | 174/53 |
| 6,265,662 B1 * | 7/2001 | Riedy et al. | ..................... | 174/67 |
| 6,444,906 B1 * | 9/2002 | Lewis | ............................. | 174/53 |
| 6,610,927 B2 * | 8/2003 | Dinh et al. | ........................ | 174/66 |
| 6,843,669 B2 * | 1/2005 | Drane et al. | .................. | 174/480 |
| 7,388,164 B2 * | 6/2008 | Scanzillo | ....................... | 174/482 |
| 7,728,226 B2 * | 6/2010 | Drane et al. | .................... | 174/66 |
| 7,763,799 B2 * | 7/2010 | Johnson | ......................... | 174/67 |

* cited by examiner

*Primary Examiner* — Angel R Estrada
(74) *Attorney, Agent, or Firm* — McCormick, Paulding & Huber LLP

(57) ABSTRACT

A connection box provides power and/or data distribution for outdoor structures including decks, terraces and patios by including one or more connection points that are sheltered from moisture and harmful weather conditions by a lid having drip edges and a gasket. The connection box mounts flush with a surface so that it does not pose a tripping hazard, and can include a light to aid in locating the connection points.

19 Claims, 5 Drawing Sheets

OUTDOOR ELECTRICAL BOX

FIELD OF THE INVENTION

The present invention relates to outdoor power distribution and, more particularly, to electrical connection points that remain sheltered from the elements when connected to an electrical device.

BACKGROUND OF THE INVENTION

Electrical power has been a part of modern life for more than a century and has become a familiar indoor convenience. Indoors, almost every appliance for daily use requires electrical power. However, outdoor access to electrical power cannot yet be described as convenient.

For consumers who wish to combine an outdoor lifestyle with the conveniences of modern life, provision of electrical power presents immediate difficulties. While vertical wall-mounted receptacles are known for outdoor power distribution, such receptacles require use of an extension cord to distribute power to any significant distance from the wall. The inconveniences associated with use of an extension cord, such as a tripping hazard, essentially limit outdoor power distribution to locations near the wall-mounted receptacle.

In order to provide electrical power at locations distant from existing walls, various devices have been proposed. For example, post-mounted outdoor receptacles have been provided. However, the post-mounted receptacles can be visually obtrusive. Additionally, the post-mounted receptacles are prone to inadvertent displacement or damage due to their protruding structure.

Further, while outdoor provision of electrical power is known, no special provisions are known for outdoor access to telephone, computer, audio-visual, or optical network data.

Accordingly, it is desirable to have an outdoor connection point that provides electrical power and/or data, that is suitable for horizontal or vertical use distant from existing structural walls, that is weatherproof, and that is visually and physically unobtrusive.

BRIEF SUMMARY OF THE INVENTION

The present invention solves a problem of distributing power and/or data to an outdoor environment such as a deck, patio, terrace, or any type of surface subjected to outdoor use. The present invention achieves its objective by providing one or more connection points that are sheltered from the elements. The present invention allows for installation anywhere on/in outdoor living space.

According to the present invention, an outdoor connection box provides a connection point that is accessible for connecting an electrical cable, and that is weatherproof. The outdoor connection box is suitable for horizontal use distant from structural walls, and is physically and/or visually unobtrusive.

In one embodiment, the outdoor connection box includes a housing defining plug and drip chambers, and at least one cable opening allowing communication between the chambers. A connection point is housed in the plug chamber. A lid is adapted to substantially cover the box, thereby sealing an opening of the plug chamber. When the lid covers the box, a cable connected to the connection point can be passed through the cable opening and egress from the box around an edge of the lid. The lid has drip edges that prevent liquid from entering the box, and has a liquid collection area with drain hole.

The connection box according to the present invention is capable of being mounted flush with the mounting surface and does not pose a tripping hazard.

Another feature of the present invention is a safety switch that allows the connection point to be energized only when the lid is closed. The safety switch helps to protect the connection point from problems that might occur if the connection point was exposed to moisture while energized when the lid is in an open position.

A further feature of the present invention is a light that aids in locating the unit and allows safe attachment of the plug of the connected equipment to the device in low light situations.

According to an embodiment of the present invention, the connection box provides a separate compartment for low voltage devices/connections.

The outdoor floor box can be installed into application such as decks, patios, terrace, or any type of surface subjected to outside use. The floor box can be mounted in a horizontal position as well as in a vertical position.

These and other objects, features and advantages of the present invention will become apparent in light of the detailed description of the best mode embodiment thereof, as illustrated in the accompanying drawings.

DETAILED DESCRIPTION OF EMBODIMENTS

Figure 1:
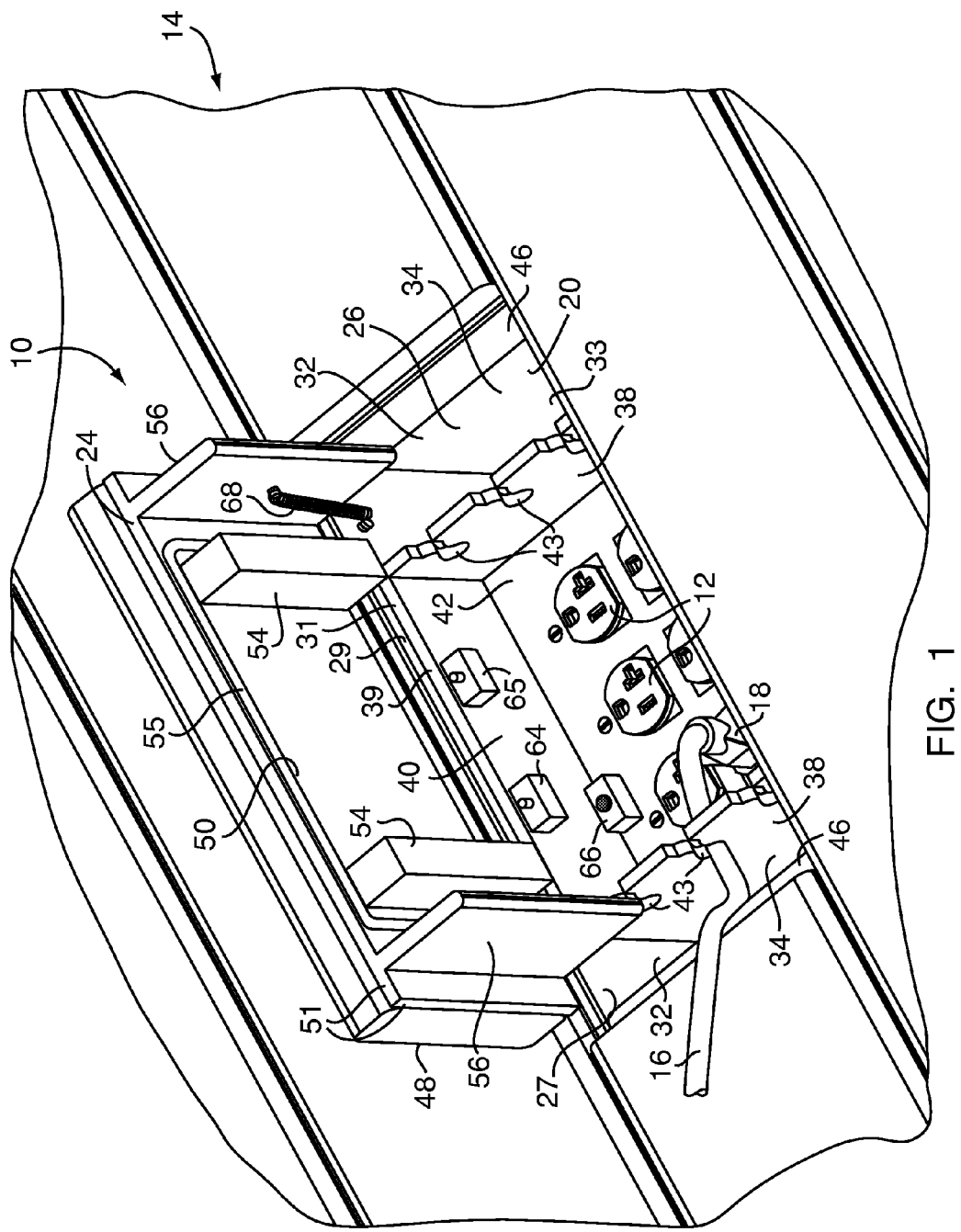
FIG. 1 is a perspective view of a flush-mounted outdoor connection box with a lid in an open position, according to an embodiment of the present invention.

Referring to FIG. 1, an outdoor connection box 10 housing one or more electrical connection points 12, such as electrical power receptacles, data jacks, or optical fiber connectors, is horizontally mounted to a deck 14. The connection box 10 includes a housing 20 and a lid 24. The lid 24 is hingedly connected to the housing 20 and is movable relative to the housing 20 between a closed position substantially covering the housing 20 and a plurality of open positions, including the partially open position shown in FIG. 1. An electrical appliance or data device (not shown) can be connected to a selected connection point 12 via a cable 16 having a plug 18.

Figure 2:
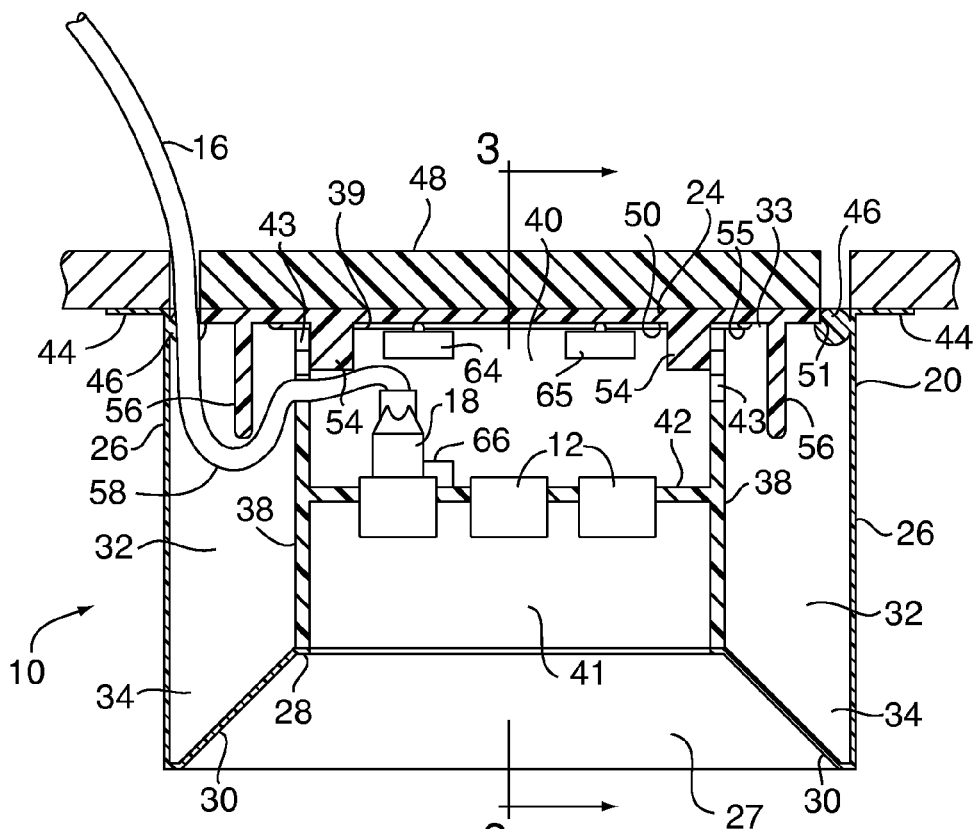
FIG. 2 is a front sectional view of the outdoor connection box of FIG. 1 with the lid in a closed position.

Referring to FIG. 2, the housing 20 includes side walls 26 and end walls 27, a back wall 28, and sloped walls 30, which together define and partially enclose a drip chamber 32. The drip chamber 32 has an opening 33 opposite the back wall 28, and includes a trough 34 defined between the sloped walls 30 and the side walls 26. Drain holes 36 are provided at corners of the trough 34.

Figure 4:
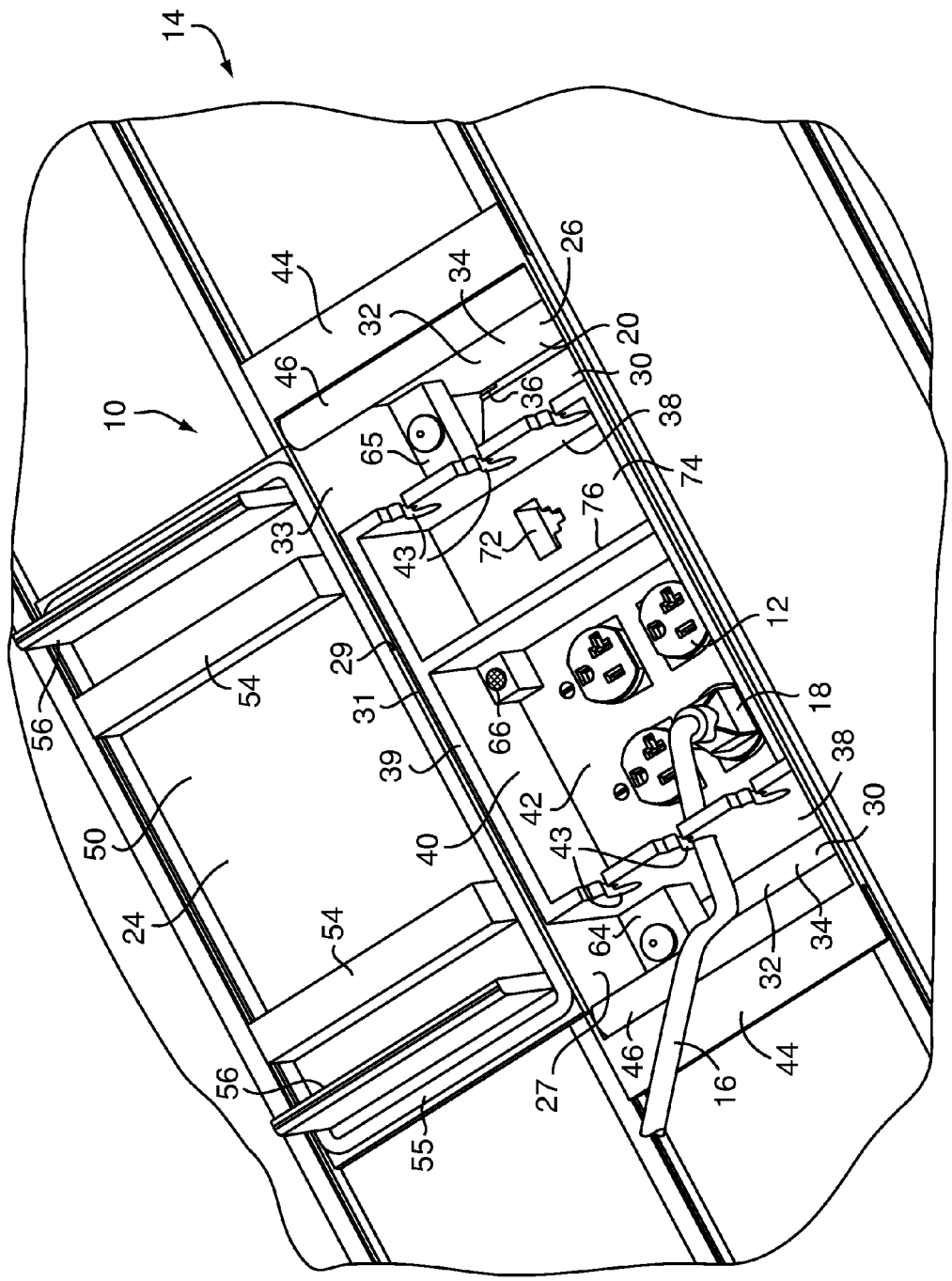
FIG. 4 is a perspective view of a surface-mounted outdoor connection box with a lid in a fully open position, according to another embodiment of the present invention.
Figure 5:
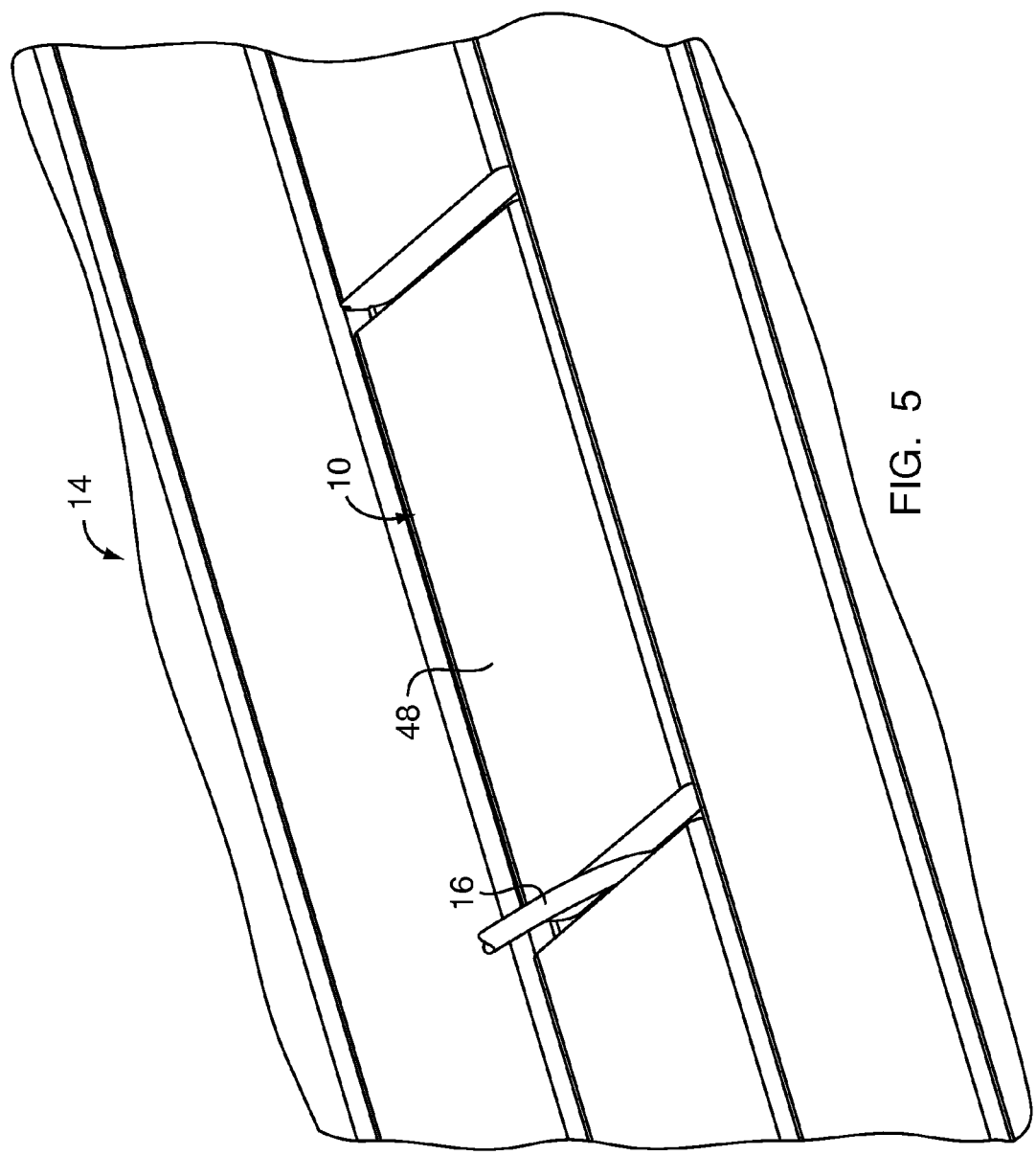
FIG. 5 is a perspective view of the flush-mounted box of FIG. 1 with the lid in a closed position.
Figure 6:
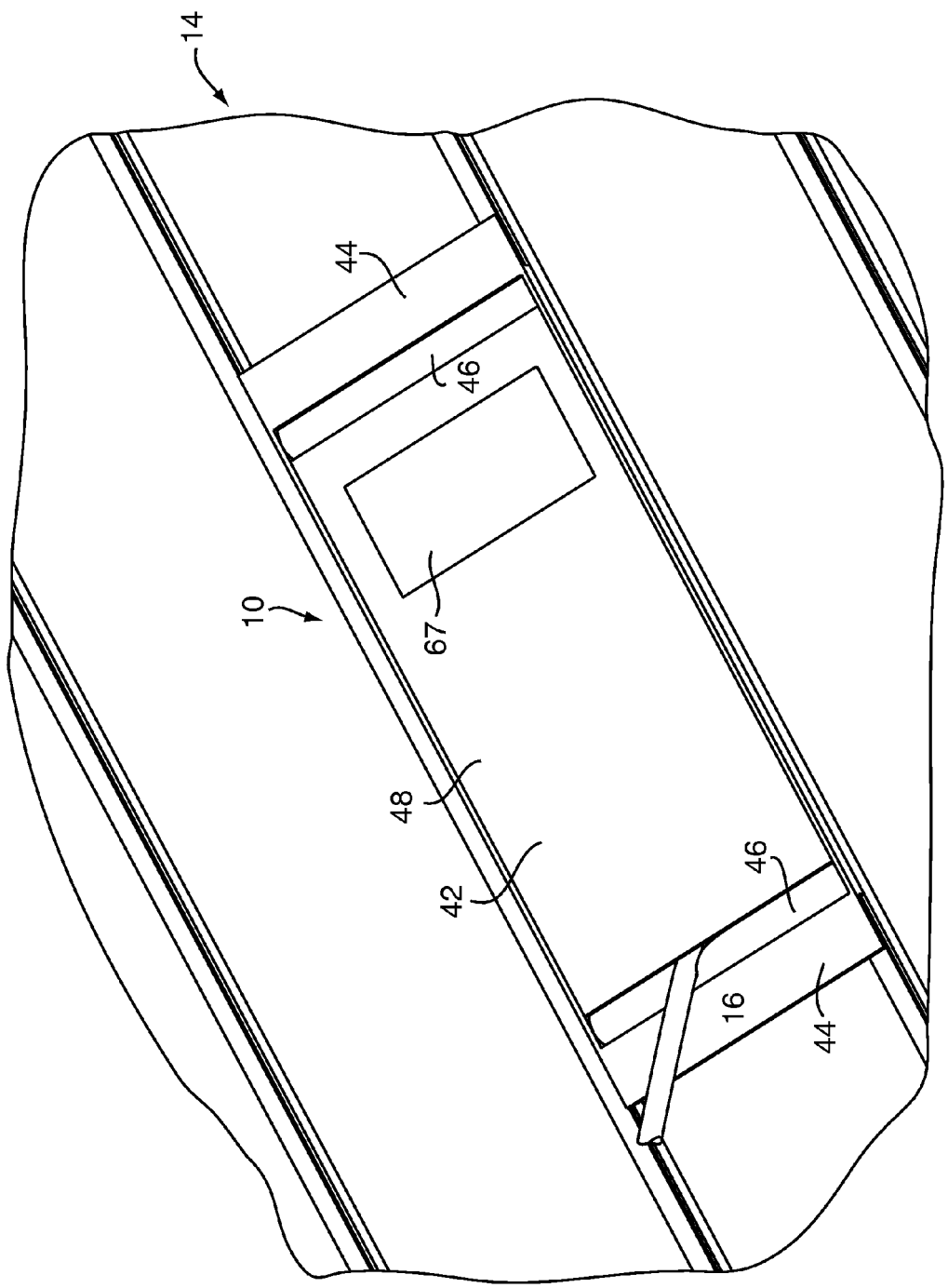
FIG. 6 is a perspective view of the surface-mounted box of FIG. 4 with the lid in a closed position.

The side walls 26 include a mounting flange 44 and a deformable outer gasket 46. Alternatively, the outer gasket 46 can be attached to the lid 24. The side walls 26 and the mounting flange 44 are arranged so that the box 10 can be fastened to upper or lower surfaces of deckboards between joists of the deck 14, as shown in FIGS. 1 and 4. The mounting flange 44 can be integrally formed with the side walls 26 or can be attached as a separate piece to the side walls 26. If formed as a separate piece, the mounting flange 44 can be adjusted relative to the side walls 26 so that, when the box 10 is mounted to the deck 14 and the lid 24 is closed, an upper surface of the lid 24 is substantially flush with an upper surface of the deck 14, as shown in FIGS. 5 and 6.

As best seen in FIGS. 2 and 4, inner walls 38 extend from the back wall 28 to the opening 33, defining an upper edge 39 substantially coplanar with the opening 33, and supporting a bracket 42. The inner walls 38 include cable openings 43 for passage of electrical cables 16. The bracket 42 is adapted to receive and support the connection points 12. As shown in FIG. 2, the bracket 42 and the inner walls 38 define a plug chamber 40 extending from the bracket 42 to the upper edge 39 and a wiring chamber 41 extending from the bracket 42 to the back wall 28. The inner walls 38 separate the plug chamber 40 and the wiring chamber 41 from the drip chamber 32. Plugs 18 can be inserted into the connection points 12 from the plug chamber 40, while wiring for the connection points 12 is disposed in the wiring chamber 41 and can be accessed via the back wall 28. Alternatively, the back wall 28 can be omitted. Also, the bracket 42 can be supported by the back wall 28, can be hung from the upper edge 39 of the inner walls 38, or can be supported by other means which would be within the scope of one of ordinary skill in the art.

As shown in FIGS. 1-4, the lid 24 includes a weather surface 48 and an inner surface 50 bordered by outer edges 51. The mounting flange 44 is adapted for attachment to an upper surface of the deck 14, as shown in FIGS. 4 and 6, or to a lower surface of the deck 14, as shown in FIGS. 1 and 5. In the embodiment shown in FIGS. 1 and 5, material matching the deck 14 is fastened to the lid 24 to form the weather surface 48, thereby adjusting a height of the lid 24 to substantially match a thickness of the deck 14, and also making the lid 24 inconspicuous against the deck 14 as shown in FIG. 5. Alternatively, referring to FIG. 6, the weather surface 48 can be fabricated from other material, and the weather surface 48 can be made substantially flush with the deck 14 by fastening the mounting flange 44 to the upper surface of the deck 14. Referring back to FIG. 4, the inner surface 50 of the lid 24 includes an inner gasket 54, a perimeter gasket 55, and a drip edge 56. As best seen in FIG. 2, the drip edge 56 is arranged to extend from the inner surface 50 toward the trough 34 when the lid 24 is closed.

Figure 3:
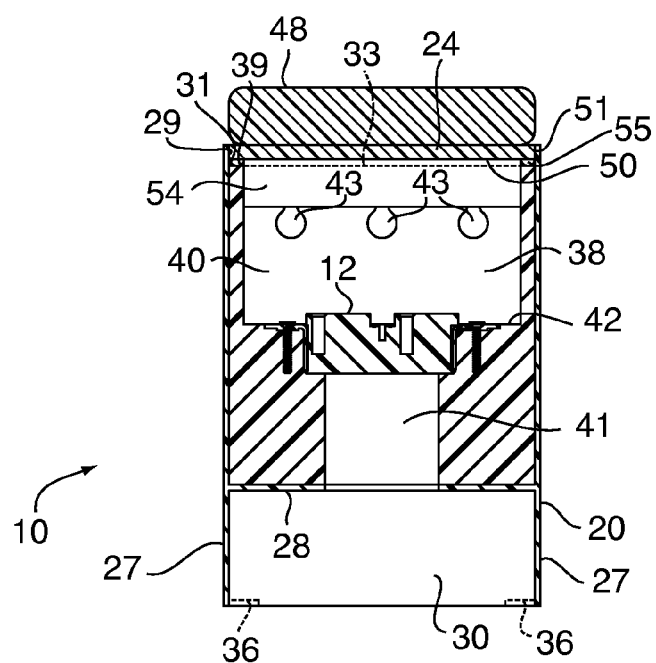
FIG. 3 is a side sectional view of the outdoor connection box of FIG. 2.

Referring to FIG. 3, the end walls 27 have inner surfaces 29 which are arranged to define a ledge 31 with a portion of the upper edge 39 of the inner walls 38. The outer edges 51 of the lid 24 are arranged to abut the end walls 27 when the lid 24 is closed. The perimeter gasket 55 is arranged to sealingly abut the ledge 31 when the lid 24 is closed.

Referring back to FIG. 1, in one embodiment, the connection points 12 include electrical power receptacles. The connection box 10 includes a safety switch 64 to energize the power receptacles 12 when the lid 24 is closed, and to interrupt power to the power receptacles 12 when the lid 24 is not closed. Preferably, the safety switch 64 is weatherproofed individually. The safety switch 64 can be located anywhere within the box 10.

In an embodiment of the present invention, the connection box 10 also includes a light switch 65 that activates a light 66, which is energized when the lid 24 is not closed and is de-energized when the lid 24 is closed. The light 66 is, for example, an LED light powered by, for example, solar energy. An associated solar panel 67 can be disposed in the weather surface 48 of the lid 24, as shown in FIG. 6. Other variations on the light 66 are within the scope of ordinary skill in the art.

Preferably, the lid 24 is biased to the closed position. For example, the lid 24 may be biased to the closed position by a spring 68, as shown in FIG. 1. Other biasing means or devices, such as torsion springs, live hinges, counterweights, and the like, are known to those of ordinary skill, and are intended to be within the scope of the present invention.

Referring to FIG. 4, in an embodiment of the present invention, the connection points 12 include a data jack 72. The data jack 72 can be provided in a separate compartment 74 defined by cross wall 76.

The connection points 12 can be obtained commercially. The housing 20, the lid 24, and the bracket 42 can be formed from metal or polymer stock. As discussed above, the lid 24 in some embodiments can include a weather surface 48 formed from material matching the deck 14 or other mounting surface. Optimally, the lid 24 and the housing 20 are arranged to support a design live floor load of the deck 14.

In operation, during normal conditions, the lid 24 is closed, as shown in FIG. 2. Accordingly, the outer edges 51 of the lid 24 sealingly abut the outer gasket 46, the inner surface 50 of the lid 24 abuts the upper edge 39 of the inner walls 38, the inner gasket 54 sealingly abuts the inner walls 38, and the drip edge 56 extends between the inner walls 38 and the side walls 26. Also, as shown in FIG. 3, when the lid 24 is closed, the perimeter gasket 55 sealingly abuts the ledge 31.

Referring back to FIG. 2, when the plug 18 is inserted into one of the receptacles 12, the cable 16 is passed through one of the cable openings 43, and when the lid 24 is in the closed position, one of the outer edges 51 presses the cable 16 against the outer gasket 46 while the drip edge 56 and the cable openings 43 cooperate to impose a drip loop 58 in the cable 16. The drip loop 58 ensures that any moisture passing along the cable 16 will be diverted from the plug chamber 40 and will drop from the drip loop 58 into the trough 34. Alternatively, the inner walls 38 can be omitted and the bracket 42 can be arranged so that the plug 18 and the drip edge 56 cooperate to impose the drip loop 58 in the cable 16. The moisture that drops from the drip loop 58 drains from the connection box 10 through the drain holes 36 formed in the trough 34. Thus, the lid 24 and the housing 20 allow horizontal installation of upward-facing connection points 12 while preventing entry of moisture into the connection points 12.

When the lid 24 is opened, the plug 18 can be accessed via the plug chamber 40 for insertion or removal of the plug 18 into or from one of the connection points 12. Referring to FIG. 1, in some embodiments, opening the lid 24 causes the safety switch 64 to deenergize the connection points 12. In some embodiments, opening the lid 24 causes the light switch 65 to energize the light 66.

One advantage of the present invention is that infiltration of moisture into the connection box 10 is prevented, thereby permitting the connection box 10 to be mounted horizontally in the deck 14, which is exposed to inclement weather.

Another advantage of the present invention is that the connection box 10 can be mounted in the deck 14 so that the weather surface 48 of the lid 24 is substantially flush with the deck 14 while the connection points 12 are in use, thereby providing access to electrical power without posing a trip hazard.

A further advantage of the present invention is that the connection box 10 can be mounted in the deck 14 so that the connection points 12 face substantially upward, thereby providing easy insertion and removal of the plug 18 into or from one of the connection points 12.

Accordingly, the present invention provides horizontally installed, weatherproof electrical connection points with reduced trip hazards.

Although this invention has been shown and described with respect to the detailed embodiments thereof, it will be understood by those skilled in the art that various changes in form and detail thereof may be made without departing from the spirit and the scope of the invention. For example, the connection box 10 can be mounted vertically in a building wall, with the mounting flange 44 providing attachment to vertical stringers, and the back wall 28 providing access for cables from the building wall to the connection points 12. As another example, the connection box 10 could be mounted in a concrete or flagstone patio, with the back wall 28 providing access for subsoil cables to the connection points 12.

What is claimed is:

1. An outdoor connection box comprising:
   a housing defining a plug chamber; and
   a lid movable between a closed position and a plurality of open positions, the lid in the closed position being adapted to seal an opening of the plug chamber;
   wherein the housing is adapted to support at least one connection point so that the at least one connection point is accessible from the plug chamber, and, when the lid is in the closed position, a cable connected to the at least one connection point can egress the housing around the lid; and
   wherein the lid includes an inner gasket that sealingly contacts a wall defining the plug chamber when the lid is in the closed position.

2. The connection box according to claim 1, wherein the housing includes a drip chamber substantially adjacent the plug chamber.

3. The connection box according to claim 2, wherein a wall separating the drip chamber from the plug chamber includes a cable opening for passage of a cable connected to the receptacle.

4. The connection box according to claim 2, wherein the drip chamber includes a trough having drain holes to allow moisture to drain from the trough.

5. The connection box according to claim 1, wherein the lid includes a drip edge arranged so as to impose a drip loop in a portion of the cable when the lid is in the closed position.

6. The connection box according to claim 1, wherein the plug chamber includes a trough having drain holes to allow moisture to drain from the trough.

7. The connection box according to claim 1, wherein the housing supports an outer gasket arranged so as to sealingly contact the lid when the lid is in the closed position.

8. The connection box according to claim 7, wherein the outer gasket is deformable to permit egress of the cable.

9. The connection box according to claim 1, further comprising a safety switch, wherein the safety switch cooperates with the lid to energize the at least one connection point when the lid is in the closed position.

10. The connection box according to claim 1, further comprising a light switch, wherein the light switch cooperates with the lid to energize a light when the lid is not in the closed position.

11. The connection box according to claim 1, wherein the lid is biased to cover the box.

12. The connection box according to claim 1, wherein the at least one connection point is an electrical power receptacle.

13. The connection box according to claim 1, wherein the at least one connection point is a data jack.

14. The connection box according to claim 1, wherein the housing includes a mounting flange adapted for attaching the box to a structure and further adapted so that, when the lid covers the box and the box is attached to the structure, an outer surface of the lid is substantially flush with an outer surface of the structure.

15. The connection box according to claim 14, wherein the mounting flange is adjustably connected to the housing.

16. An outdoor connection box comprising:
    walls partially enclosing a chamber;
    a lid adapted to close the chamber; and
    a connection point housed in the chamber,
    wherein at least one of the walls supports a mounting flange adapted for attaching the box to a structure; and
    wherein, when the lid is closed and the box is attached to the structure, a weather surface of the lid is substantially flush with a surface of the structure, and a cable connected to the connection point can egress the box around the lid; and
    wherein the lid includes an inner gasket that sealingly contacts the wall when the lid is in the closed position.

17. The box according to claim 16, wherein the mounting flange is adjustably connected to the at least one of the walls.

18. The box according to claim 16, wherein the lid is adapted to impose a drip loop on the cable when the lid is closed.

19. An outdoor electrical box comprising:
    a housing defining a plug chamber; and
    a lid movable between a closed position and a plurality of open positions, the lid in the closed position being adapted to seal an opening of the plug chamber;
    wherein the housing is adapted to support a connection point so that, when the lid is closed, the lid imposes a drip loop in a cable connected to the connection point; and
    wherein the lid includes an inner gasket that sealingly contacts the housing when the lid is in the closed position.

* * * * *